US011002536B2

(12) United States Patent
Dumble et al.

(10) Patent No.: US 11,002,536 B2
(45) Date of Patent: May 11, 2021

(54) LOW COST IMPLEMENT POSITIONING

(71) Applicant: AGJUNCTION LLC, Hiawatha, KS (US)

(72) Inventors: Steven J. Dumble, Fortitude Valley (AU); Tri M. Dang, Durack (AU)

(73) Assignee: AGJUNCTION LLC, Scottsdale, AZ (US)

(*) Notice: Subject to any disclaimer, the term of this patent is extended or adjusted under 35 U.S.C. 154(b) by 567 days.

(21) Appl. No.: 15/873,805

(22) Filed: Jan. 17, 2018

(65) Prior Publication Data
US 2018/0202804 A1 Jul. 19, 2018

Related U.S. Application Data

(60) Provisional application No. 62/448,246, filed on Jan. 19, 2017.

(51) Int. Cl.
G01B 21/16 (2006.01)
G01B 21/24 (2006.01)
G01C 19/56 (2012.01)
G01B 17/00 (2006.01)
A01B 69/00 (2006.01)
(Continued)

(52) U.S. Cl.
CPC ............ *G01B 21/16* (2013.01); *A01B 69/003* (2013.01); *G01B 17/00* (2013.01); *G01B 21/24* (2013.01); *G01C 19/56* (2013.01); *A01B 59/00* (2013.01); *A01B 69/004* (2013.01); *A01B 69/008* (2013.01); *B62D 49/06* (2013.01)

(58) Field of Classification Search
CPC combination set(s) only.
See application file for complete search history.

(56) References Cited

U.S. PATENT DOCUMENTS 5,194,851 A   3/1993  Kraning et al.
5,390,125 A   2/1995  Sennott et al.
(Continued)

FOREIGN PATENT DOCUMENTS

EP        1969916 A1    9/2008
WO     1995/015499 A1    6/1995
(Continued)

OTHER PUBLICATIONS

International Search Report and Written Opinion; PCT/US2018/014109; dated May 28, 2018.
(Continued)

*Primary Examiner* — Abby Y Lin
*Assistant Examiner* — Renee LaRose
(74) *Attorney, Agent, or Firm* — Schwabe Williamson & Wyatt

(57) ABSTRACT

A method for estimation of relative coordinates between two parts of a linked vehicle system. The system includes a towing vehicle and a towed implement or trailer. A first sensor is configured to measure the movement rate of the towing vehicle while a second sensor is configured to measure the movement rate of the towed implement. Both sensors interact with each other to measure the absolute distance between sensors. Using the known linkage geometry, relative distance between the sensors and relative rotation rates, the relative coordinates between the towing vehicle and towed implement can be estimated.

19 Claims, 11 Drawing Sheets

(51) Int. Cl.
*B62D 49/06* (2006.01)
*A01B 59/00* (2006.01)
*A01B 69/04* (2006.01)

(56) References Cited

U.S. PATENT DOCUMENTS

| | | |
|---|---|---|
| 5,663,879 A | 9/1997 | Trovato |
| 5,923,270 A | 7/1999 | Sampo |
| 5,928,309 A | 7/1999 | Korver et al. |
| 6,052,647 A | 4/2000 | Parkinson et al. |
| 6,070,673 A | 6/2000 | Wendte |
| 6,212,453 B1 | 4/2001 | Kawagoe |
| 6,377,889 B1 | 4/2002 | Soest |
| 6,445,983 B1 | 9/2002 | Dickson et al. |
| 6,539,303 B2 | 3/2003 | McClure et al. |
| 6,789,014 B1 | 9/2004 | Rekow et al. |
| 6,819,780 B2 | 11/2004 | Benson |
| 6,865,465 B2 | 3/2005 | McClure |
| 7,142,956 B2 | 11/2006 | Heiniger |
| 7,277,792 B2 | 10/2007 | Overschie |
| 7,437,230 B2 | 10/2008 | McClure |
| 7,460,942 B2 | 12/2008 | Mailer |
| 8,190,337 B2 | 5/2012 | McClure |
| 8,589,013 B2 | 11/2013 | Pieper et al. |
| 8,649,930 B2 | 2/2014 | Reeve et al. |
| 2002/0072850 A1 | 6/2002 | McClure et al. |
| 2004/0186644 A1 | 9/2004 | McClure et al. |
| 2006/0167600 A1 | 7/2006 | Nelson, Jr. et al. |
| 2010/0084147 A1 | 4/2010 | Aral |
| 2010/0274452 A1 | 10/2010 | Ringwald et al. |
| 2015/0342110 A1* | 12/2015 | Peake .................. A01B 69/004 701/50 |
| 2016/0039456 A1* | 2/2016 | Lavoie ..................... B60D 1/62 701/41 |
| 2016/0280267 A1* | 9/2016 | Lavoie .................. B62D 13/06 |

FOREIGN PATENT DOCUMENTS

| | | |
|---|---|---|
| WO | 2008/080193 A1 | 7/2008 |
| WO | 2016/099386 A1 | 6/2016 |
| WO | 2018/136560 | 7/2018 |

OTHER PUBLICATIONS

Liang Chu et al., "Estimation fo Articulation Angle for Tractor Semi-Trailer Bsed on State Observer", 2010 International Conference on Measuring Tecynolgy and Mechatronics Austomation: ICMTMA 2010; Changsha City, China, Mar. 13-14, 2010, IEEE, Piscataway, NJ, USA, Mar. 13, 2010, pp. 158-163, XP031673229, ISBN: 978-1-4244-5001-5 the whole document.

International Preliminary Report on Patentability; PCT/US2018/014109; dated Aug. 1, 2019.

Noh, Kwang-Mo, "Self-tuning Controller for Farm Tractor Guidance"; Digital Repository @ Iowa State University, Retrospective Theses and Dissertations. Paper 9874; (1990); 192 pages.

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

* cited by examiner

LOW COST IMPLEMENT POSITIONING

The present application claims priority to U.S. Provisional Patent Application Ser. No. 62/448,246 filed on 19 Jan. 2017, entitled LOW COST ULTRASONIC IMPLEMENT POSITIONING, which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to position tracking and machine control of moving vehicles, and to using distance and angular rate sensors for machine control systems.

BACKGROUND

Farm equipment, known as implements, may be used for various agricultural tasks, such as tilling, planting seeds, spreading fertilizer, harvesting, or other similar tasks. Such tasks are typically performed by towing the implement with a towing vehicle, such as a tractor, over swaths of a field until the entire field is covered. To optimize time and minimize costs, these tasks are best performed in a fashion that either eliminates or keeps overlap between swaths to a minimum. This requires accuracy in controlling the implement. The process of guiding a towed implement or trailer accurately on a desired path via maneuvering the towing vehicle, such as a tractor, requires knowledge of the towed implement's position and orientation relative to the path. For conventionally controlled vehicles, e.g. tractors that are manned and driven by an operator, the tractor's or other towing vehicle's operator may rely upon mirrors and direct visual observation, combined with operational experience, to correctly control the vehicle so that the towed implement is guided along the desired path.

With their increasing maturity and availability, computer assisted and autonomous driving systems may be deployed to either assist or fully control vehicles that may be towing an implement, such as a tractor and coupled farm implement. These systems, moreover, may be able to exercise a level of precision control in maneuvering a towing vehicle that is difficult, if not impossible, for a human operator to achieve. Where a towed implement is used to complete a task, precision positioning of the implement with respect to an intended path may be critical. As the path traveled by the implement may depend upon the path of the towing vehicle, accurate implement control via a computer-assisted or autonomous driving (CA/AD) system requires position and orientation information of not only the vehicle, but also the implement. Knowledge of the position of the implement may enable the CA/AD system to guide the towing vehicle/tractor so that the implement follows a prescribed path.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1:
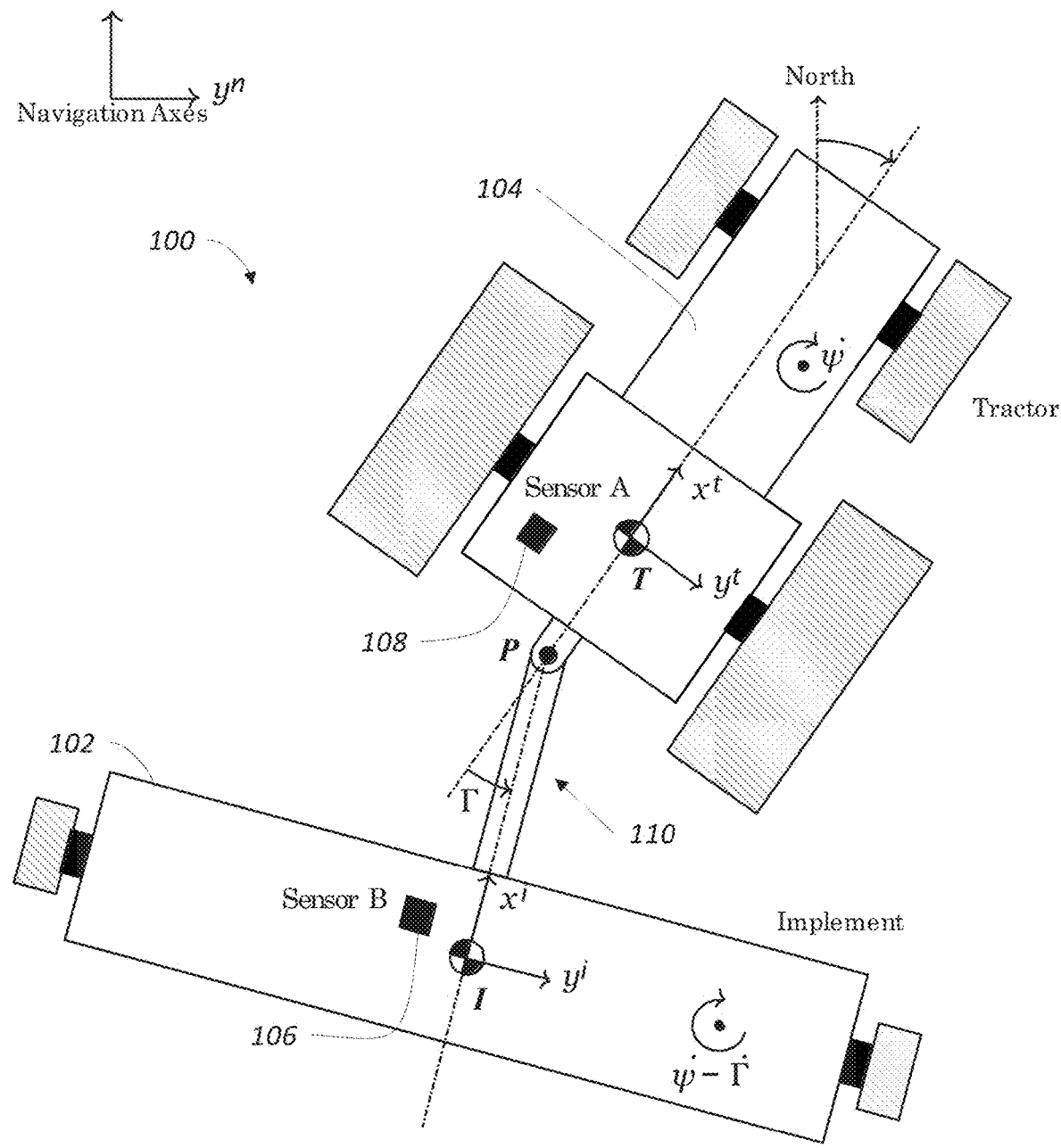
FIG. 1 is a schematic diagram depicting the arrangement of sensors and control points on a towing vehicle and a towed implement for positioning the implement, according to various embodiments.

In contrast with an implement that is rigidly secured to a vehicle, a towed implement may be attached to the towing vehicle via an articulated connection. In such implementations, the towed implement can follow a different path than the towing vehicle, with the position and geometry between the towed implement and towing vehicle subject to change as the combination travels. To guide an implement attached via an articulated connection along a towed path using a towing vehicle such as a tractor, a CA/AD system may need to know not only the absolute position of the towing vehicle, but also the position of the towed implement, either in an absolute sense or relative to the towing vehicle's position. One technique to determine the absolute position and orientation of a vehicle or implement (such as a tractor) is to use a global navigation satellite system (GNSS) receiver, such as the global positioning system (GPS). One or more inertial sensors may also be included to provide additional information for determining the complete position and orientation of the vehicle. The absolute position of both the towing vehicle and towed implement, then, could be determined by placing GNSS and inertial sensors on both the towing vehicle and towed implement. Information from all sensors can then be supplied to a CA/AD system for accurate control. However, having two sets of GNSS and inertial sensors increases the cost of implementing a CA/AD system configured to guide a towed implement. Additionally, GNSS systems can complex, especially when relatively high accuracy (e.g. within a few centimeters) is required, such as in a farming operation. This complexity may further add to the cost, and so make placing a high-precision GNSS on both a tractor and implement undesirable.

As an alternative, if the relative position of one vehicle can be determined with respect to the other, the GNSS and inertial systems for determining absolute position need only be placed on one vehicle, either the towing vehicle or towed implement. Only a means to determine a change in the relative position and orientation between the vehicle and trailer would then be needed. This means could be, for example, systems or sensors such as visual sensors, to estimate the relative position and orientation of a towed implement.

As will be detailed further herein, if the geometry between a towing vehicle and towed vehicle can be tied to a common fixed point, a towed implement's position relative to the towing vehicle may be determined by measuring the distance between a fixed point on the towing vehicle and a fixed point on the towed vehicle. Determining such a distance may be accomplished using relatively simple means, including mechanical means such as a linkage or electronic means for range finding, as will be described herein. Knowing the distance and geometry allows computation of an articulation angle between the towing vehicle and towed vehicle. Once this articulation angle is known, the position of the towed implement relative to the towing vehicle can be determined, and provided to a CA/AD system.

Figure 12:
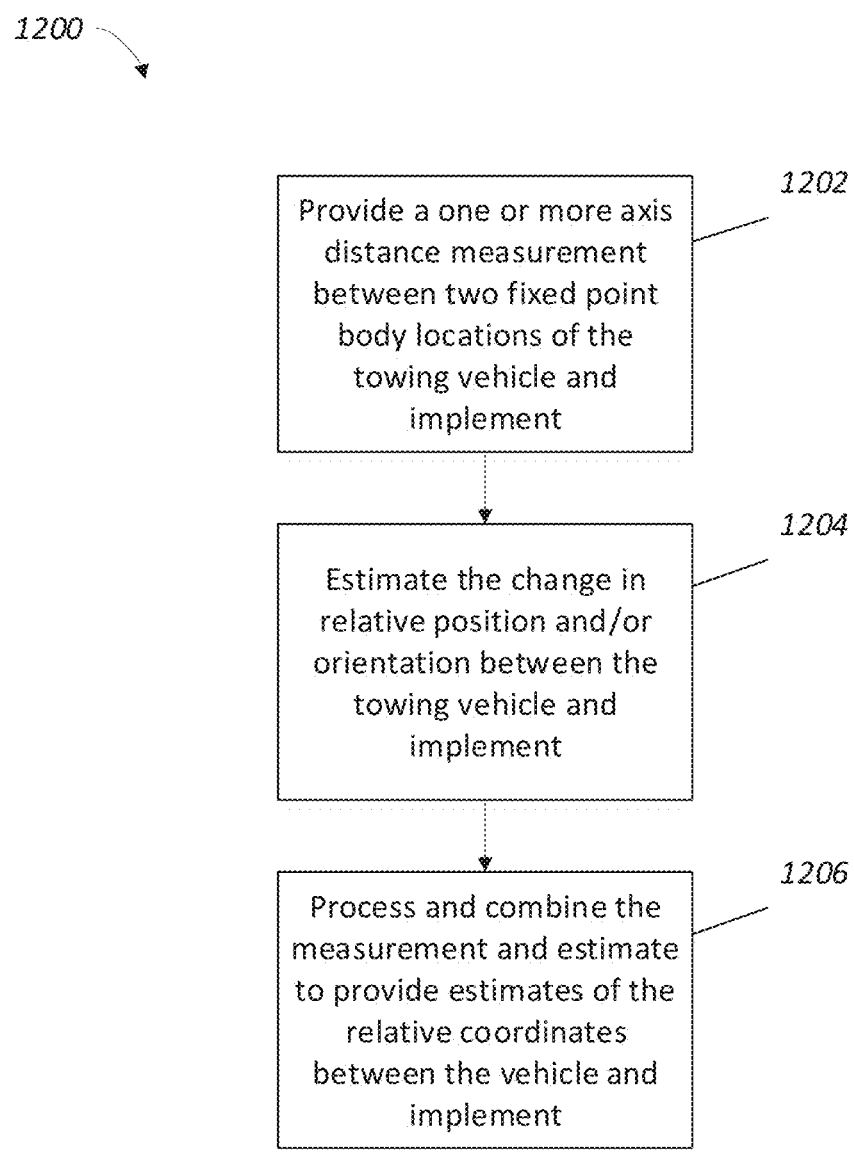
FIG. 12 is a flow chart of the basic steps to be carried out to determine the position of a towed implement with respect to a towing vehicle, according to various embodiments.

In various embodiments, the process of determining the position of a towed implement relative to a towing vehicle comprises one or more operations of the following method 1200, detailed in FIG. 12: (A) providing a one or more axis distance measurement between two fixed point body locations of the towing vehicle and implement, in block 1202; (B) estimating the change in relative position and/or orientation between the towing vehicle and implement, in block 1204; and (C) processing and combining the measurement and estimate to provide estimates of the relative coordinates between the vehicle and implement, in block 1206. The measurements in block 1202 may be used directly with block 1206, skipping block 1204, if the accuracy requirements are met without the need of additional filtering or data fusion, as will be described further herein.

As will be described further below with respect to FIGS. 1 and 2, some embodiments of method 1200 may comprise a first sensor 108 that is attached to the main body of a towing vehicle 104, and a second sensor 106 which is attached to an implement 102 hitched to the towing vehicle 104. In block 1202, the first and second sensors 108, 106 are used to provide a distance measurement between them. The first and second sensors 106, 108 may both use gyroscopes to measure the yaw rate of the respective towing vehicle 104 and implement 102 to which they are attached. In block 1204, the difference between the measured rates of both sensors may be integrated with respect to time to provide an estimate of the change of relative orientation between the towing vehicle 104 and implement 102. The operations of block 1206 may use the information determined in blocks 1202 and 1204 to estimate the articulation angle between the towing vehicle and implement, which defines the relative coordinates between the vehicle and implement. The process of combining measurements from blocks 1202 and 1204 in block 1206 may allow some errors in the sensing systems to be compensated, enabling a system implementing method 1200 to provide the positional accuracy required for centimeter level implement control. These blocks 1202 to 1206 will be referred to throughout the following specification.

One possible embodiment may implement the sensors as ultrasonic sensors to determine a distance between the towing vehicle/tractor, and a towed implement. Ultrasonic sensors transmit and/or receive ultrasonic signals. By measuring the time difference between the transmission of an ultrasonic signal or pulse at one location and receipt of the same signal at a second location, commonly referred to as "Time of Flight," it is possible to calculate the distance between the locations. Different combinations of multiple receivers or transmitters can be used to estimate a position within three dimensions. This forms a basis to ultrasonic positioning systems. Ultrasonic sensors can be relatively cheap to deploy as they use sound waves, and the distance measurements can be easily achieved using Time of Flight calculations, as opposed to optical and radio range finding systems which may require more complex and/or higher speed processing.

Ultrasonic range finding has been shown to be accurate to 1 mm in ideal indoor locations with a range of around 30 meters. However, environmental conditions, noise, and multi path reflections may diminish this accuracy, which may diminish the reliability of distance measurements when ultrasonic sensors are deployed on outdoor equipment, such as tractors and towed implements. Consequently, the computed articulation angle likewise may be subject to diminished accuracy. Gyroscopes are a type of inertial sensor that provides estimates of the rotation rate of a rigid body in one or more axes, and can be combined with distance information as described herein to help compensate for ultrasonic range finding inaccuracies. Similar to ultrasonic sensors, gyroscopes can be procured for a relatively low cost.

According to various embodiments, the distance information supplied by a source such as the aforementioned ultrasonic sensors may be combined with articulation angle rates measured by a gyroscope to compensate for possible errors and/or inaccuracies in the distance measurements, as will be described herein. The resulting combined information may be used to determine the relative position of an implement with respect to a towing vehicle; in some embodiments, down to centimeter accuracy.

As used herein, the term "vehicle" may mean either a towing vehicle or a towed implement. "Towing vehicle" may refer to any vehicle capable of towing an implement, such as a tractor. While a tractor is depicted and may be referenced herein, it is intended only to be an example representation of the broader category encompassed by "towing vehicle," and not in a limiting sense. Likewise, "implement" and "towed implement" are merely example representations of a broader category of "towed vehicle". The disclosed systems and methods may be employed outside of the context of farm equipment, such as for tractor-trailer combinations (also known as "semis" or "trucks"), or commercial or private automobiles or trucks towing trailers of any sort, e.g. RVs, travel trailers, cargo trailers, etc. The disclosed systems and methods may be deployed for use with any CA/AD system.

In FIG. 1, the overall layout of a possible embodiment of a system 100 for determining the position of a towed implement 102 relative to a towing vehicle (here, a tractor) 104 is depicted. As described above and may be seen in FIG. 1, implement 102 is attached to towing vehicle 104 via an articulating connection 110, which pivots at a point P. A first sensor 108 may be disposed on the towing vehicle 104 at a first point, and a second sensor 106 may be disposed on the implement 102 at a second point. The first point and second point selected for the sensors on implement 102 and towing vehicle 104 may be relatively arbitrary, so long as first sensor 108 and second sensor 106 are able to communicate with each other to determine their distance from each other across the possible range of articulation for articulating connection 110 while towing vehicle 104 and implement 102 are in use. Articulating connection 110 may be any linkage that allows towing vehicle 104 to tow and control implement 102, and may vary depending upon the nature of towing vehicle 104 and implement 102. It will be appreciated by a person skilled in the relevant art that the nature of articulating connection 110 may impact upon how towing vehicle 104 may be directed to ensure that implement 102 travels over a desired path.

In some embodiments, towing vehicle 104 and implement 102, as described above, may be farm equipment. Towing vehicle 104 may be a tractor, combine, grain truck, or similar such powered vehicle. Implement 102 may be any number of various farm equipments, e.g. bailers, tillers, seed drills, fertilizers, etc. In other embodiments, towing vehicle 104 may be a conventional vehicle, such as a passenger car or truck, with implement 102 being a trailer such as a boat trailer, travel trailer, cargo trailer, car hauler, or any other type of vehicle that may be towed by towing vehicle 104. In still other embodiments, towing vehicle 104 and implement 102 may be a commercial combination vehicle, such as a tractor-trailer combination or "semi".

Towing vehicle 104 may be controlled partially or wholly by a CA/AD system, as described above, in various embodiments. The CA/AD system may be any sort of CA/AD system that is now known or later developed, and that may receive input to control towing vehicle 104 to navigate implement 102 along a predetermined path. In some embodiments, the CA/AD system may be required to navigate implement 102 along a path with a high degree of precision, e.g. within a few centimeters of the intended track. Examples of such precision tasks may include delivery of seed, fertilizer, or pesticides in farm contexts, where overseeding between rows and/or over fertilization or over application of pesticides may have undesirable effects, beyond simply wasting money.

Figure 2:
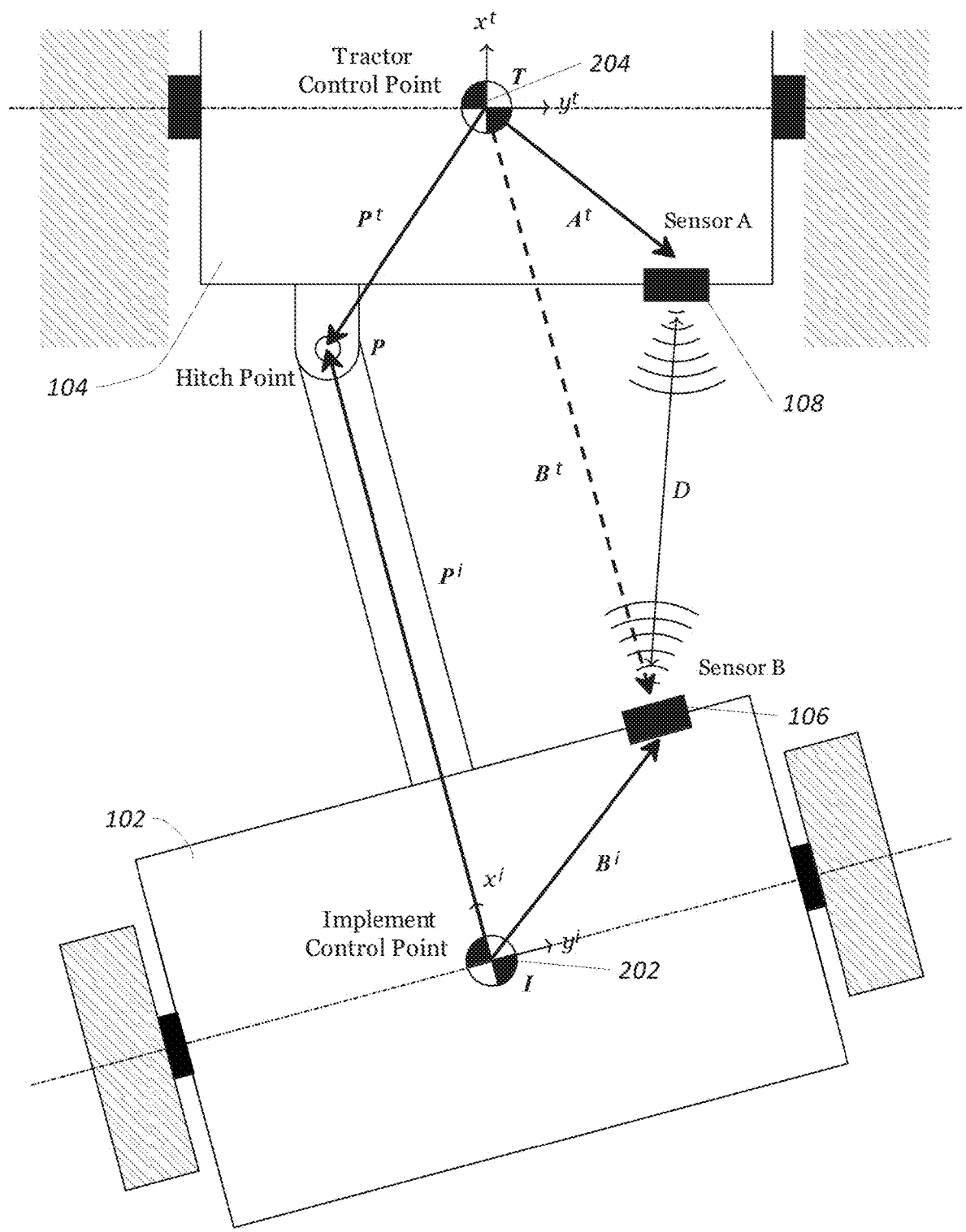
FIG. 2 is a schematic diagram depicting the coordinate systems of the towing vehicle and towed implement of FIG. 1, according to various embodiments.

The geometry between towing vehicle 104 and implement 102 according to some embodiments is depicted in FIG. 1 and in greater detail in FIG. 2. During operation, implement 102 may be at some articulation angle F relative to the towing vehicle 104, which may be articulated around the hitch or pin point P. Towing vehicle 104 defines a control point 204, which can be referenced to an origin T in an associated towing vehicle coordinate frame. The towing vehicle coordinate frame is axis-aligned with the towing vehicle 104 body: x-axis is forward and y-axis is to the right with respect to the towing vehicle. Similarly, implement 102 defines a control point 202, which can be referenced to an origin I in an associated implement coordinate frame. The implement coordinate frame is axis aligned with the implement 102 body, and as with the towing vehicle 104 body, the x-axis is forward and the y-axis is to the right with respect to the implement. It will thus be appreciated that as implement 102 moves with respect to towing vehicle 104, their respective coordinate frames will vary in alignment to each other.

The position of implement 102 with respect to towing vehicle 104 can be expressed with respect to the coordinate frame of either the towing vehicle 102 or the implement 104. The towing vehicle 104 frame and implement 102 frame may be linked by the articulation angle F around the hitch point P. Thus, the position of the hitch point P in the towing vehicle 104 coordinate frame and in the implement 102 coordinate frame may be linked together by the assumption that the location of hitch point P coincides in both coordinate frames. This may allow the position of control point 202 to be related to the position of control point 204, and, by extension, the position of implement 102 to be determined with respect to towing vehicle 104. If the absolute position of towing vehicle 104 can be determined, e.g. using GPS and/or similar sensors, then the absolute position of implement 102 likewise may be derived by referencing the absolute position of towing vehicle 104, which may be provided to a CA/AD system for automatic steering of the towing vehicle 104 in such a fashion that implement 102 may be guided over a predetermined course.

The detailed geometry is shown in FIG. 2, and will be referenced further herein. With reference to block 1202 of FIG. 12, first sensor 108 and second sensor 106 may work in cooperation to provide a distance measurement D, which is the distance between sensors 108 and 106 which are fixed on the body of the towing vehicle 104 and implement 102, respectively.

Figure 3:
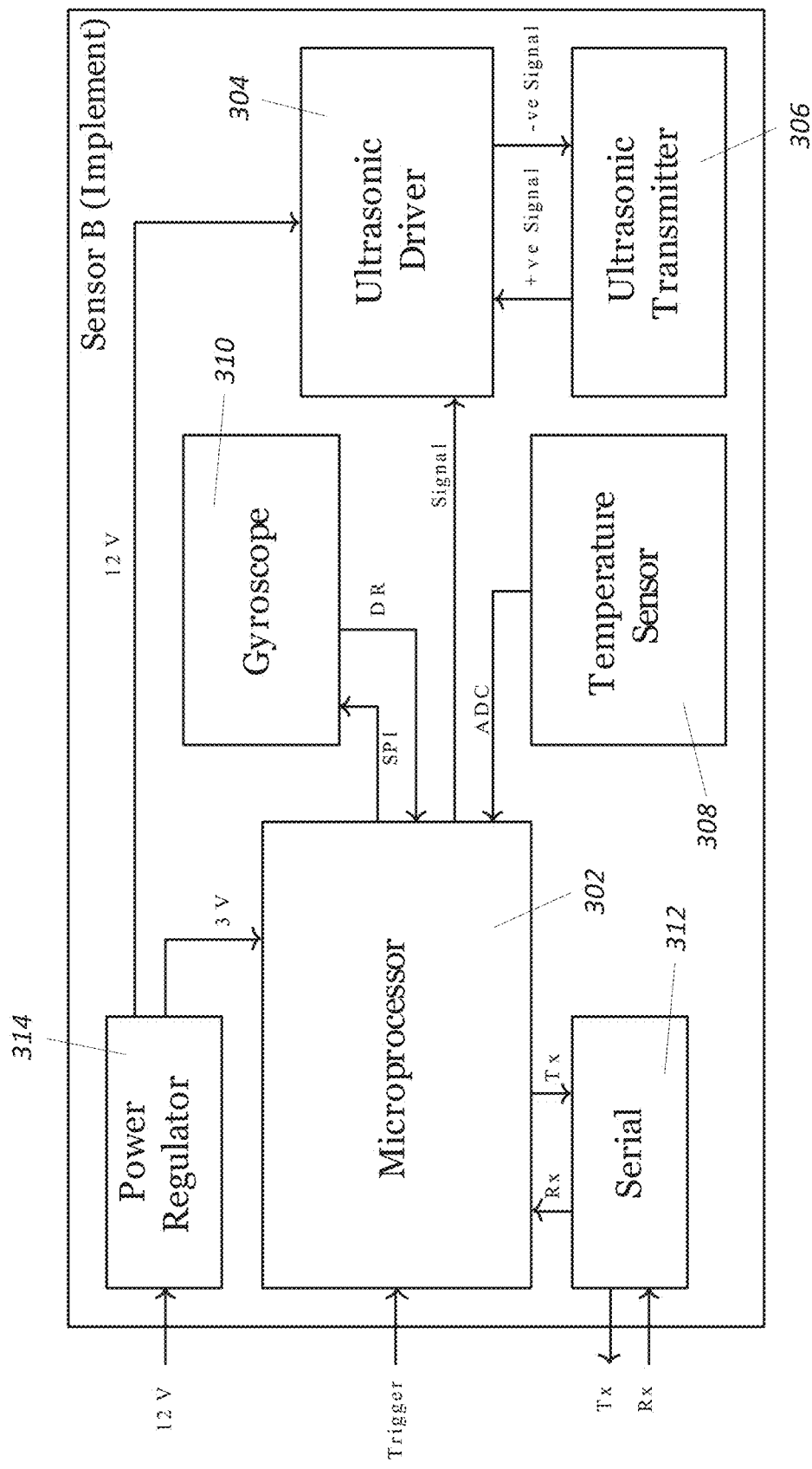
FIG. 3 is a block diagram of an example embodiment of a sensor unit for mounting to a towed implement, as depicted in FIG. 1.
Figure 4:
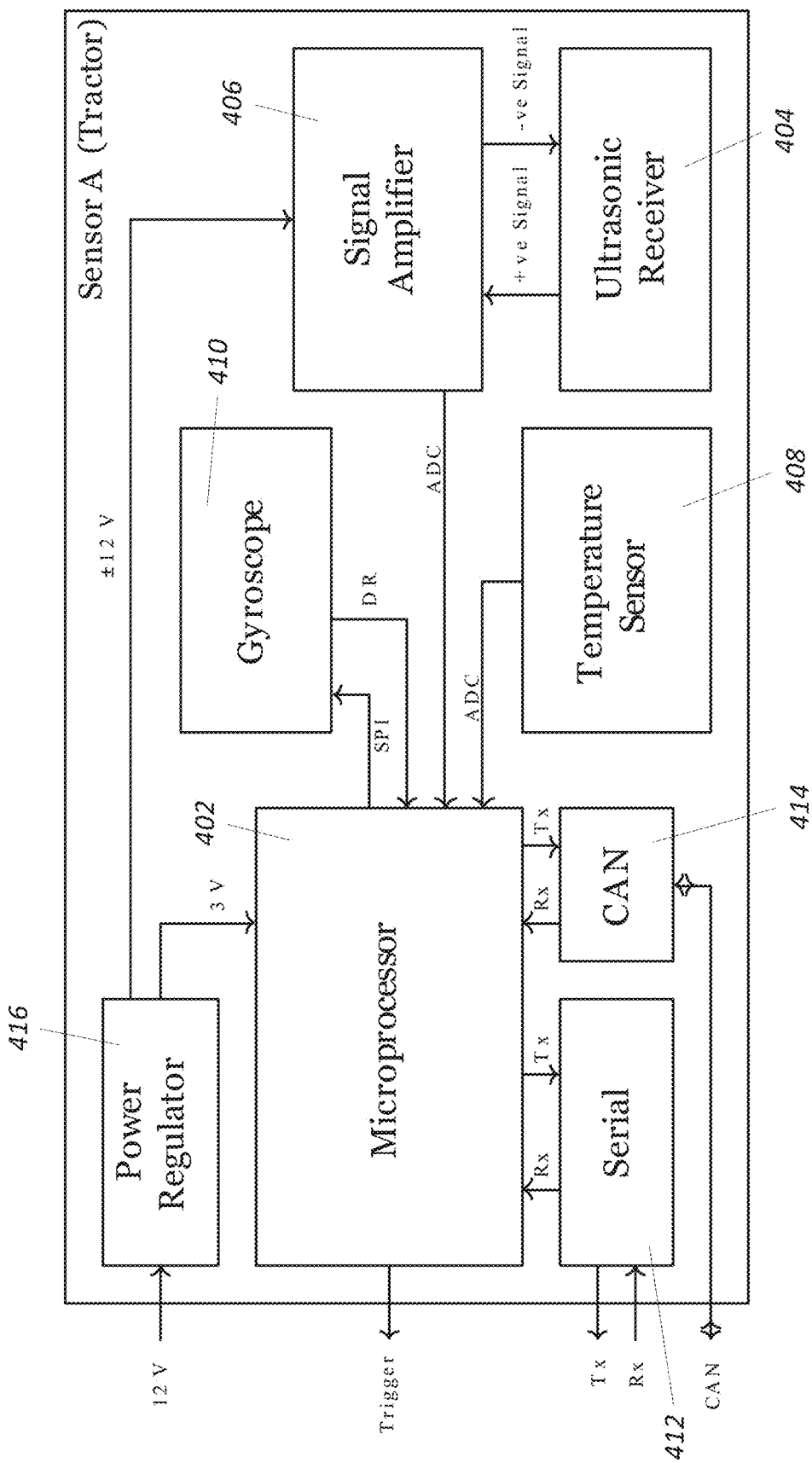
FIG. 4 is a block diagram of an example embodiment of a sensor unit for mounting to a towing vehicle such as a towing vehicle, as depicted in FIG. 1.

FIGS. 3 and 4 depict the internal configuration of an example first sensor 108 and second sensor 106, according to some embodiments. As depicted, first sensor 108 and second sensor 106 include ultrasonic sensors for determining distances, as well as gyroscopic sensors. First sensor 108 and second sensor 106 each may consist of a single axis gyroscope and ultrasonic transceiver. In other embodiments, first sensor 108 and second sensor 106 may be implemented using different means, such as mechanical means, e.g. a telescoping arm that encodes distance, RF rangefinding equipment, optical/infrared rangefinding equipment, or any other suitable means for determining the distance between a first point and a second point located on a towed implement 102 and a towing vehicle 104, respectively.

Still other embodiments may not require a second sensor 106 on towed implement 102, or at all. For example, where an optical means of rangefinding is employed, a simple reflective surface or target may be all that is needed on towed implement 102, with all measuring and computations handled by first sensor 108 on the towing vehicle. It will also be appreciated that the position of sensors may be reversed. Some possible embodiments may place the first sensor 108 on towed implement 102, and wirelessly or by wire send necessary positional information back to a CA/AD system on towing vehicle 104.

FIG. 3 shows the various hardware components that could comprise second sensor 106, according to some embodiments. Second sensor 106 may include a microprocessor 302, which in turn is in communication with an ultrasonic driver 304. The ultrasonic driver 304 may further signal an ultrasonic transmitter 306. Microprocessor 302 may further be in communication with other sensors, such as a temperature sensor 308 and gyroscope 310. Sensor 106 may include a serial interface 312, in communication with microprocessor 302, for transmitting sensor data, as well as receiving data from sensor 108 and/or other systems or sensors. A power regulator 314 may supply power within any necessary specifications to the various components of second sensor 106. As can be seen in FIG. 3, microprocessor 302 may include a trigger line, which signals microprocessor 302 to in turn signal ultrasonic driver 304 to initiate a pulse via ultrasonic transmitter 306.

FIG. 4 shows the various hardware components that could comprise first sensor 108, according to some embodiments. First sensor 108 may likewise include a microprocessor 402, which in turn may be in communication with an ultrasonic receiver 404, which feeds to a signal amplifier 406. Microprocessor 402 may further be in communication with other sensors, such as a temperature sensor 408 and gyroscope 410. As with second sensor 108, first sensor 106 may include a serial interface 412, in communication with microprocessor 402, for transmitting sensor data, as well as receiving data from sensor 106 and/or other systems or sensors. First sensor 108 may include a CAN bus module 414 for communicating and exchange data with various systems that may be on towing vehicle 104 and/or implement 102. As with second sensor 106, a power regulator 416 may supply power within any necessary specifications to the various components of first sensor 108.

The microprocessors 302 and 402 may be any suitable microprocessor or other processing unit suitable for handling the processing tasks carried out by first sensor 108 and second sensor 106. In some embodiments, microprocessors 302 and/or 402 may be general purpose processing units. In other embodiments, microprocessors 302 and/or 402 may be custom developed units or ASICs, or another suitable processing unit. Microprocessors 302 and/or 402 may have additional supporting circuitry or components commonly related to processors, such as storage (volatile and/or nonvolatile), input/output interfaces, networking interfaces, display interfaces, etc. The storage may be used to store instructions to carry out some or all of the various steps and methods described herein. Some or all of the functionality described herein may be implemented using software instructions. Such software instructions may be stored on a storage device that is either part of or in communication with microprocessor 302 and/or 402. In such embodiments, the storage may comprise a "computer readable medium."

Ultrasonic components, including ultrasonic driver 304, ultrasonic transmitter 306, ultrasonic receiver 404, and signal amplifier 406, may be implemented using any suitable components, such as commercially available ultrasonic transmission and reception units. Such components may be relatively inexpensive to procure, are stable and mature in development, and so offer a high degree of reliability. Likewise, temperature sensors 308 and 408 may be implemented using any suitable means for determining or sensing temperature. Gyroscopes 310 and 410 may be any suitable means for determining angular rates of change, and may include implementations such as low-cost, readily available MEMS gyros, such as those used in consumer electronics to detect motion. Other types of gyros may be employed, so long as they provide suitable sensitivity to angular change for the purposes of sensors 108 and 106. Some embodiments of sensors 108 and 106 may also have other, additional sensors to provide additional spatial information, and/or may have additional gyros to provide multi-dimensional measurements of angular changes to allow for compensation of first sensor 108 and second sensor 106 being placed at odd tilts or angles.

Figure 9:
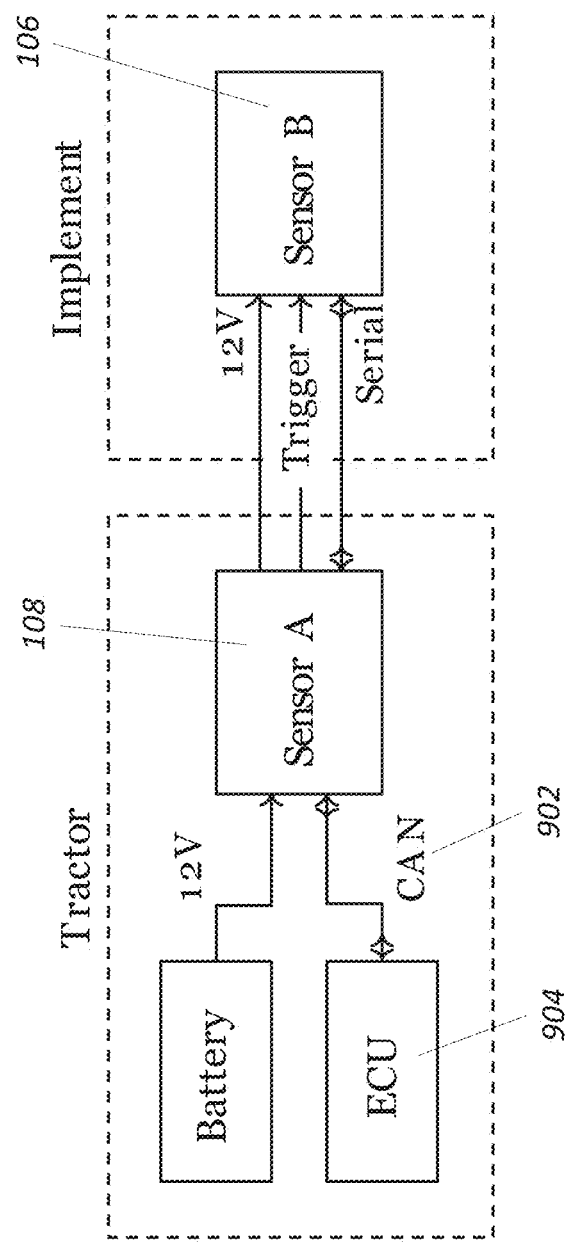
FIG. 9 is a block diagram of how the sensors of FIGS. 3 and 4 may interconnect with each other, and a steering control unit in the towing vehicle, according to various embodiments.

FIG. 9 depicts a diagram of how first sensor 108 and second sensor 106 may interconnect with each other and a steering control unit, according to embodiments. First sensor 108 and second sensor 106 may connect via various data and/or signal lines, including serial and trigger lines, as depicted in FIGS. 3 and 4, connecting to each of first sensor 108 and second sensor 106. The various lines may interconnect the microprocessors of first sensor 108 and second sensor 106, when implemented per the embodiments of FIGS. 3 and 4. Of particular import is the trigger line, which first sensor 108 may use to signal second sensor 106 to transmit an ultrasonic pulse, to commence rangefinding operations. The serial line may allow exchange of sensor data. First sensor 108 may also connect via a CAN bus line 902 to an engine control unit (ECU) 904, in some embodiments. ECU 904 may include an implementation of an automatic steering guidance or other CA/AD system.

First sensor 108 and second sensor 106 may be linked via any suitable fashion that ensures relatively fast transmission. In some embodiments, first and second sensors 106, 108 may be linked via cabling or wiring, such as through connectors associated with the hitch mechanism between towed implement 102 and towing vehicle 104. Other embodiments may use wireless or optical signaling between first and second sensors 106, 108. Any suitable means of enabling reliable communication between the sensors to allow exchange of triggers and sensor data may be employed.

As discussed previously, in embodiments where first sensor 108 and second sensor 106 are configured with ultrasonic sensors, ranging to determine distance D may use a technique called 'time of flight'. In a "Time of Flight" calculation, the amount of time it takes for an ultrasonic pulse to travel between a transmitter and receiver is measured and the distance the sound has traveled can be estimated from this measurement. The distance D that ultrasonic waves travel in a given amount of time t is calculated by equation (1), D=vt, where v is the speed of ultrasonic sound through air. The speed of sound in standard air at sea level is 343.2 m/s, although this speed can vary depending upon environmental conditions. For example, temperature affects the speed of sound, which may be accounted for using equation (2):

$$v = 331.3\sqrt{1 + \frac{\gamma}{273.15}} \qquad (2)$$

where γ is the air temperature in degrees Celsius, assuming zero humidity. Temperature readings for γ may be provided by temperature sensors 308 and 408.

Figure 7:
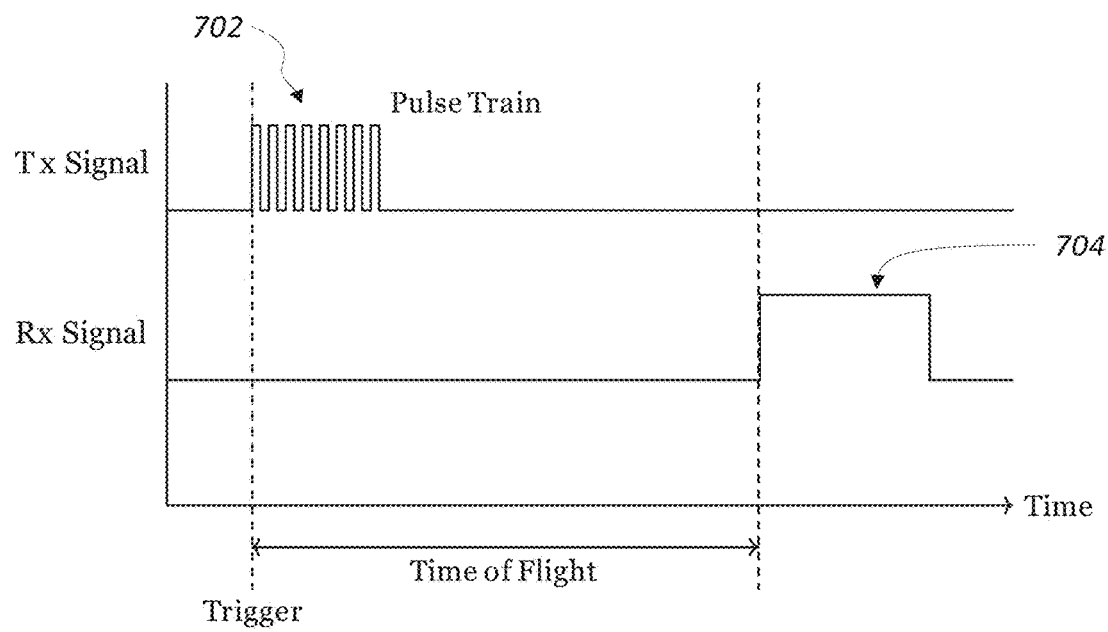
FIG. 7 is a chart demonstrating a mode of operation for determining a distance between the sensor units of FIGS. 3 and 4, where the sensor units are implemented as ultrasonic sensors, according to various embodiments.

A diagram of one possible signal pattern for ultrasonic ranging in some embodiments is shown in FIG. 7. The ultrasonic receiver 404 in first sensor 108 and the ultrasonic transmitter 306 in second sensor 106 may be time synced together. A trigger signal from first sensor 108 may cause second sensor 106 to start to transmit a train of ultrasonic pulses 702 at the operational frequency of the ultrasonic transmitter 306. First sensor 108 may use the ultrasonic receiver 404 to detect the first of the transmitted ultrasonic pulse 702. The time between first sensor 108 triggering second sensor 106 and first sensor 108 receiving the ultrasonic signal 704 is the 'time of flight', which may then be used to estimate the distance between the sensors using the equations above, corrected for temperature effects when temperature measurements are available. The length of the pulse train 702 may limit the ranging sample rate that can achieved, as the pulses may need to be correlated with the correct transmission time. However, the pulse train 702 should be long enough so that the signal to noise ratio at the receiver 404 is large enough to reliably detect the transmitted signal 704.

Figure 8:
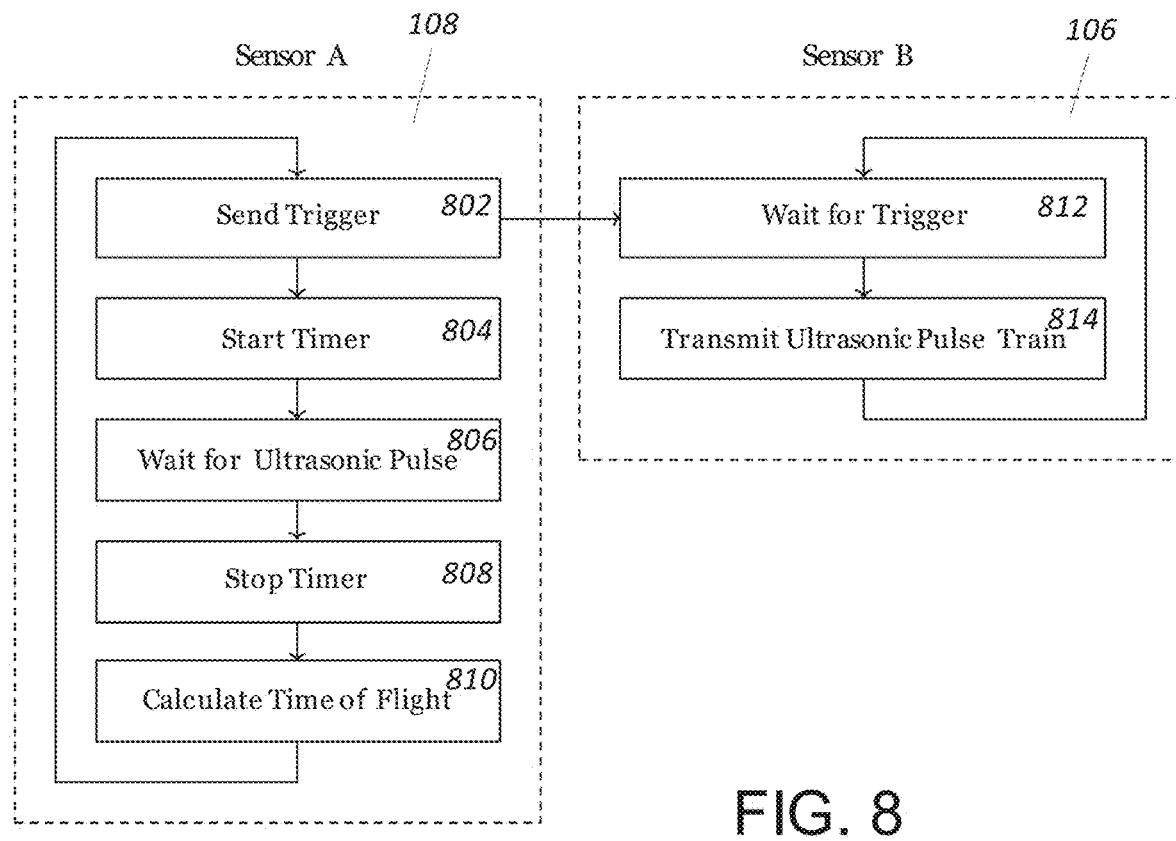
FIG. 8 is a flowchart illustrating the steps taken by the sensor units of FIGS. 3 and 4 to determine the distance between the units, according to various embodiments.

One possible embodiment of an ultrasonic process flow is shown in FIG. 8, where the process flow steps are to be carried out in whole or in part by first sensor 108 and second sensor 106. For first sensor 108, the process begins in block 802, where sensor 108 may send a trigger to second sensor 106 via a trigger line, depicted in FIGS. 3 and 4. Following sending a trigger, sensor 108 may start a timer in block 804, then may await receipt of an ultrasonic pulse in block 806. Upon receipt of the pulse, sensor 108 may stop the timer in block 808, then may use the elapsed time in block 810 to calculate the time of flight and the resulting distance, in accordance with the equations described herein. For second sensor 106, the sensor may wait for receipt of a trigger signal in block 812 across the trigger line. Upon receipt, sensor 106 may transmit an ultrasonic pulse train 702. As depicted in FIG. 8, the process flows for first sensor 108 and second sensor 106 are iterative. Each sensor may repeat its process flow indefinitely, and may repeat on a regular interval corresponding to the interval by which first sensor 108 and second sensor 106 recalculate and update the position of towed implement 102 with respect to towing vehicle 104.

With reference to block 1204 of FIG. 12, the rotation rates of the towing vehicle 104 and implement 102 are measured; combining this information may allow the change in relative orientation between the linked towed implement 102 and towing vehicle 104 (i.e. the articulation angle rate) to be measured. The measured rotation rate of the towing vehicle 104 $\omega_t$ by the first sensor's 108 gyroscope 410 may consist of the yaw rate of the vehicle $\dot{\psi}$ and gyroscope sensor bias $b_1$, such that:

$$\omega_t = \dot{\psi} + b_1 \qquad (3)$$

The measured rotation rate of the implement 102 $\omega_i$ by the second sensor 106 gyroscope 310 may consist of the yaw rate of the towing vehicle 104 $\dot{\psi}$, the articulation angle rate $\dot{\Gamma}$ and gyroscope sensor bias $b_2$, such that:

$$\omega_i = \dot{\psi} - \dot{\Gamma} + b_2 \qquad (4)$$

The difference in gyroscope 310 and 410 measurements can be used to estimate the articulation angle rate separately using:

$$\Delta\omega = \omega_t - \omega_i \qquad (5)$$

$$\Delta\omega = (\dot{\psi} + b_1) - (\dot{\psi} - \dot{\Gamma} + b_2) \qquad (6)$$

$$\dot{\Gamma}_{est} = \Delta\omega - b \qquad (7)$$

where the two gyroscope sensor biases have been combined into a single bias b.

The mounting of the gyroscopes 310 and 410 may be aligned with the vertical axis of the platform defined by a first point on towing vehicle 104 and a second point on towed implement 102. Alternatively, it is feasible to use a multi-axis gyroscope, or multiple gyroscopes at different orientations, and an appropriate coordinate transformation process to transform and extract the vertical rotation rate of the platform. One method to calculate this required transformation is to include a multi-axis accelerometer in first sensor 108 and/or second sensor 106 to measure the attitude of the sensors, allowing the mounting angles of each sensor to be estimated with an appropriate calibration process. Once the mounting angles are known, a transformation can be found to estimate the rotation rate around the vertical platform axis from multi-axis gyroscope measurements.

Figure 5:
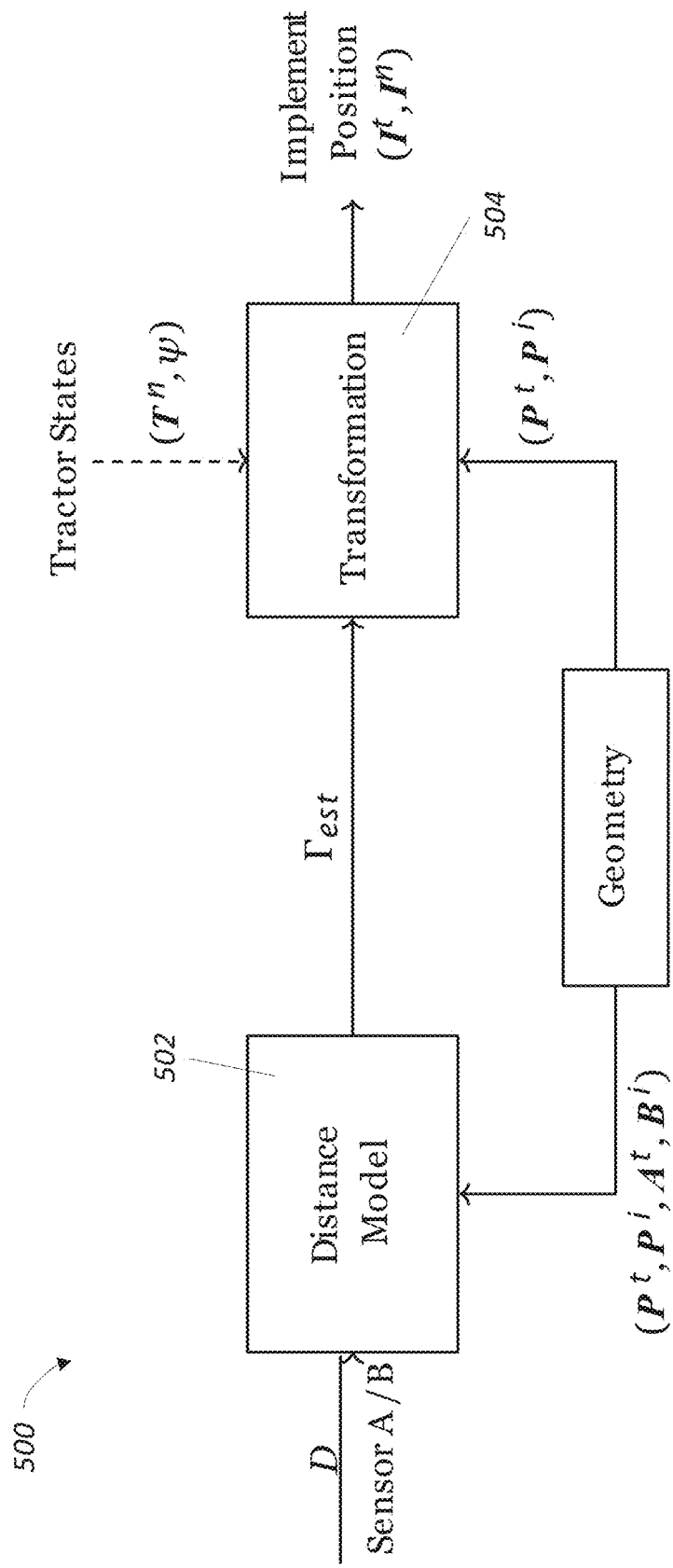
FIG. 5 is a block diagram of one example embodiment of a process for estimating the position of the towed implement depicted in FIG. 1, which may be implemented by an embodiment of the sensor units of FIGS. 3 and 4.
Figure 6:
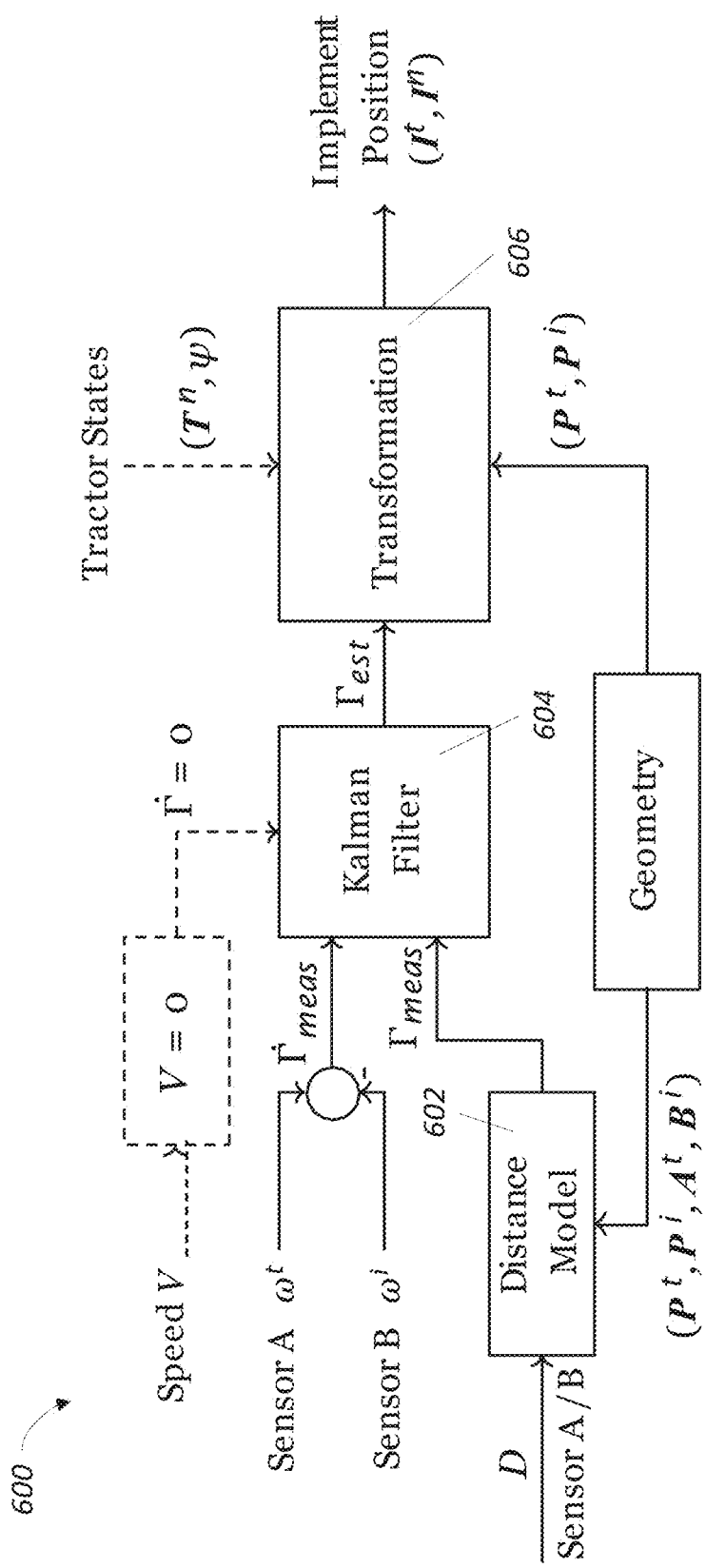
FIG. 6 is a block diagram of a second example embodiment of a process for estimating the position of the towed implement depicted in FIG. 1 where articulation angle rates are incorporated into the estimation, which may be implemented by an embodiment of the sensor units of FIGS. 3 and 4.

FIGS. 5 and 6 depict steps 500 and 600 that may be taken in whole or in part by a system 100 that executes method 1200. FIG. 5, as described above, may carry out blocks 1202 and 1206 of method 1200. FIG. 6 may additionally carry out block 1204. The processes carried out by FIGS. 5 and 6 with reference to method 1200 will be described below.

Block 1206 of FIG. 12 may involve a number of different processes. The measurements obtained in block 1202 may be used directly to estimate the articulation angle $\Gamma$, or may be combined with information from block 1204 to provide the best estimate of the articulation angle $\Gamma$ using filtering and data fusion. The process of estimating the articulation angle $\Gamma$ from a distance measurement for a known fixed geometric configuration is the Distance Model, referred to in FIG. 5 and in FIG. 6 as block 502 and 602, respectively. The distance information from block 1202 may be used to form a measurement of the articulation angle $\Gamma$. The rate information from block 1204 may be used to form the articulation angular rate, and a data fusion processes (such as a Kalman Filter, in steps 600) may be used to bring the data together to provide a more accurate articulation angle $\Gamma$ estimate than would be achieved with only using the measurement information from block 1202. Once the articulation angle $\Gamma$ has been estimated, it may be used in a transformation process to estimate the implement 102 control point position, which may in turn be used in an external process for accurate implement 102 control.

First and second sensors 108 and 106 may be used to estimate the distance D between sensors 108 and 106, which is carried out in block 1202. This may provide information which can be used to measure the articulation angle $\Gamma$. The distance D between the sensors can be expressed as:

$$D = |A - B|_2 \qquad (8)$$

where A and B are the position of first sensor 108 and second sensor 106 in either the towing vehicle 104 frame or implement 102 frame. The detailed geometry is shown in FIG. 2. Expanding equation (8) in the towing vehicle 104 frame (considering the assumption that we are only operating in a 2D plane) gives:

$$D = \sqrt{(A_x^t - B_x^t)^2 + (A_y^t - B_y^t)^2} \qquad (9)$$

where D is the straight line distance between the sensor units, $(A_x, A_y)^t$ are the fixed x-y position components of first sensor 108 mounting location relative to the towing vehicle 104 control point (expressed in the towing vehicle 104 frame), and where $(B_x, B_y)^t$ are the x-y position components of second sensor 106 relative to the towing vehicle 104 control point expressed in the towing vehicle 104 frame. The components $(B_x, B_y)^t$ are not fixed, as they may vary in relation with the articulation angle $\Gamma$. This can be recognized in FIG. 2. As the towing vehicle 104 and implement 102 rotate around the hitch point, the vector $B^t$ changes, which in turn may cause the distance D to change.

The position of second sensor 106 in the implement 102 frame can be expressed in the towing vehicle 104 frame as:

$$B^t = P^i - R^t_i(\Gamma)(P^i - B^i) \qquad (10)$$

where $B^t$ is the non-fixed position of second sensor 106 in the towing vehicle 104 frame, $P^t$ is the fixed position of the hitch point relative to the towing vehicle 104 control point in the towing vehicle 104 frame, $P^i$ is the fixed position of the hitch point relative to the implement 102 control point in the implement 102 frame, $B^i$ is the fixed mounting position of second sensor 106 in the implement 102 frame relative to the implement 102 control point and where $R^t_i(\Gamma)$ is the transform matrix which transforms a vector in the implement 102 frame to the towing vehicle 104 frame by rotating the vector by the articulation angle Γ. Expanding the above equation into its component form gives:

$$\begin{bmatrix} B_x^t \\ B_y^t \end{bmatrix} = \begin{bmatrix} P_x^t - (P_x^i - B_x^i)\cos(\Gamma) + (P_y^i - B_y^i)\sin(\Gamma) \\ P_y^t - (P_x^i - B_x^i)\sin(\Gamma) - (P_y^i - B_y^i)\cos(\Gamma) \end{bmatrix} \quad (11)$$

Substituting the position of $B^t$ in the towing vehicle 104 frame into the distance equation gives the following:

$$D^2 = [A_x^t - P_x^t + (P_x^i - B_x^i)\cos(\Gamma) - (P_y^i - B_y^i)\sin(\Gamma)]^2 + [A_y^t - P_y^t + (P_x^i - B_x^i)\sin(\Gamma) + (P_y^i - B_y^i)\cos(\Gamma)]^2 \quad (12)$$

This equation links the varying distance between first sensor 108 and second sensor 106 with the varying articulation angle Γ. All other components in the equation are fixed values for a given geometric configuration. This relationship allows a distance measurement to be linked to a given articulation angle Γ. When a distance measurement has been made, the articulation angle Γ may be estimated by inverting the above equation and solving for Γ. Since this equation is non-linear, for the general case a non-linear estimation routine (such as non-linear least squares) may be used, or a look-up table constructed. The equation $\Gamma_{meas} = \Gamma(D_{meas})$, where Γ(D) is the inverse function of the above equation D(Γ), can be solved using a non-linear estimation such as:

$$\Gamma(D_{meas}) = \min_\Gamma |D_{meas} - D(\Gamma)|^2 \quad (13)$$

Where the geometric configuration does not provide enough information to estimate the articulation angle Γ from a single pair of sensors 106, 108, additional sensors may be used and solved simultaneously to provide better estimates for the articulation angle Γ, as described above with reference to FIGS. 3 and 4. An example of a configuration that does not provide enough information to estimate articulation angle Γ is where first sensor 108 is placed at the hitch point, and second sensor 106 is placed at some distance directly behind and in-line with the hitch point P. Such a configuration may cause the measured distance D to be the same independent of the articulation angle Γ.

The next step in block 1206 may involve combining the measurements in block 1202 and block 1204 to form the best estimate of the articulation angle using a Kalman Filter or some other suitable data fusion process. The process of fusing the articulation angle Γ and articulation angle rate measurements together is the Kalman Filtering process 604 referred to in FIG. 6. This may allow some errors in the ultrasonic and inertial sensing systems to be compensated, and may help improve the level of accuracy to any required level. The following is a description of one possible implementation of a Kalman filter which can compensate for the gyroscope biases while improving the articulation angle estimation performance.

Let $x_k$ represent the Kalman filter state vector to be estimated:

$$x_k = \begin{bmatrix} \Gamma \\ b \end{bmatrix} \quad (14)$$

where the states to be estimated are the articulation angle Γ and the gyroscope second sensor 106 biases b. The Kalman filter process model matrices A and B, which may be used to predict the Kalman filter state $x_k$ at time k from the Kalman filter state $x_{k-1}$ at time k−1, and gyroscope measurements are:

$$x_k = Ax_{k-1} + Bu_k \quad (15)$$

$$\begin{bmatrix} \Gamma \\ b \end{bmatrix}_k = \begin{bmatrix} 1 & \Delta t \\ 0 & 1 \end{bmatrix} \begin{bmatrix} \Gamma \\ b \end{bmatrix}_{k-1} + \begin{bmatrix} \Delta t \\ 0 \end{bmatrix} \dot{\Gamma}_{est} \quad (16)$$

where Δt is the time step between the gyroscope updates and $\dot{\Gamma}_{est}$ is the estimate articulation angle rate which is measured in step (B). The prediction step in the filtering process may be carried out with the standard Kalman filter equations, which are shown below for completeness and should be understood by someone skilled in the art.

$$x_{k|k-1} = Ax_{k-1|k-1} + Bu_k \quad (17)$$

$$P_{k|k-1} = AP_{k-1|k-1}A^T + Q \quad (18)$$

The distance measurement $D_{meas}$ from equation (13) above and block 1202 may be converted into an articulation angle measurement $\Gamma_{meas}$ using the geometry and process described above. This measurement $z_k = \Gamma_{meas}$ may then be fused in the Kalman filter to provide a better estimate of the current state. This may done with the standard Kalman filter equations which are shown below for completeness and should be understood by someone skilled in the art.

$$y_k = z_k - Hx_{k|k-1} \quad (19)$$

$$S_k = HP_{k|k-1}H^T + R \quad (20)$$

$$k_k = P_{k|k-1}H^T S_k^{-1} \quad (21)$$

$$x_{k|k} = x_{k|k-1} + k_k y_k \quad (22)$$

$$P_{k|k} = (I - k_k H)P_{k|k-1} \quad (23)$$

Additional information may also be included in the filter. For example, when the towing vehicle 104 speed is zero (or the towing vehicle 104 is traveling in a straight line), the articulation angle rate must also be zero. Including this information may help the filter identify the gyroscope biases more rapidly. This information is depicted as the tractor states in FIGS. 5 and 6, and may be used in block 1206, described below.

The final step in block 1206 is to use the articulation angle to calculate the required implement 102 control point information, which may be needed for closed-loop automatic steering guidance for implement 102 control. The process of estimating the implement 102 control point is the Transformation process referred to in FIG. 5 as block 504 and in FIG. 6 as block 606. This transformation process may use the known towing vehicle 104 and implement 102 geometry along with the articulation angle, to project the towing vehicle 104 control point back to the implement 102 control point.

Let the position of the hitch point relative to the towing vehicle 104 control point in the towing vehicle 104 frame be $P^t$ and the hitch point relative to the implement 102 control point in the implement 102 frame be $P^i$. The relative position of the implement 102 control point relative to the towing vehicle 104 control point $I^t$ is then:

$$I^t = P^t - R^t_i(\Gamma)P^i \quad (24)$$

where $R^t_i(\Gamma)$ is the transform matrix which transforms a vector in the implement 102 frame to the towing vehicle 104 frame by rotating the vector by the articulation angle Γ. Expressing the above equation in component form gives:

$$\begin{bmatrix} I_x^t \\ I_y^t \end{bmatrix} = \begin{bmatrix} P_x^t - P_x^i \cos(\Gamma) + P_y^i \sin(\Gamma) \\ P_y^t - P_x^i \sin(\Gamma) - P_y^i \cos(\Gamma) \end{bmatrix} \quad (25)$$

This relative point may also be turned into an absolute position (i.e into a navigation frame, such as for use with GPS) if it is required for the control solution. This can be done using the known absolute control point position of the towing vehicle 104 and the project implement 102 control point position, such that:

$$I^n = T^n + R^n_t(\psi) I^t \quad (26)$$

where $I^n$ is the absolute implement 102 control point position in the navigation frame, $T^n$ is the absolute towing vehicle 104 control point position in the navigation frame, $I^t$ is the relative implement 102 control point calculated with the solution above and $R^n_t(\psi)$ is the transform matrix which transforms a vector in the towing vehicle 104 frame to the navigation frame by rotating the vector by the yaw angle of the towing vehicle 104 as shown in FIG. 1.

Figure 10:
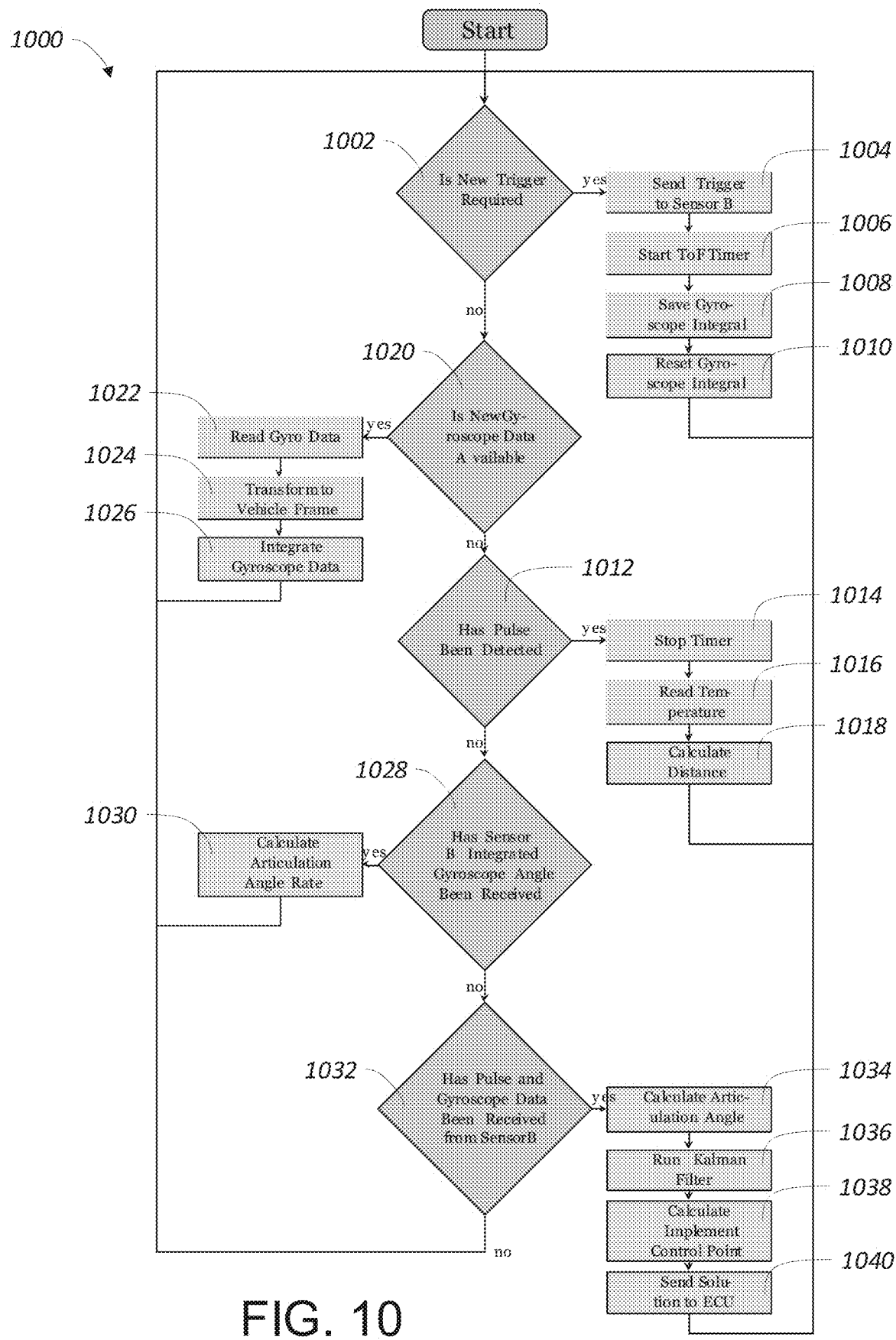
FIG. 10 is a flow chart of the process flow that may be executed by the sensor in FIG. 6, according to various embodiments.

FIG. 10 illustrates a process 1000 flow of code which could execute at least in part on the microprocessor in first sensor 108, according to embodiments. Process 1000 works in conjunction with process 1100 executed on second sensor 106. Process 1000 may continuously read the gyroscope and integrate the yaw rate (after transformation to the vehicle frame if the unit is not mounted aligned with vertical axis of the vehicle) to form a delta yaw angle. When a new sample is required in block 1002, process 1000 starts the trigging process. The triggering process sends a trigger signal to second sensor 106 in block 1004, starts the time of flight timer in block 1006, saves the integrated delta yaw angle in block 1008, and then resets the integrated angle in block 1010. When the process detects the ultrasonic pulse in block 1012, it stops the time of flight timer in block 1014, reads the temperature in block 1016, and calculates the distance in block 1018.

While waiting for receipt of the ultrasonic pulse, first sensor 108 may check to see if new gyro data is available in block 1020. If so, it may read the gyro data in block 1022, transform the data to the vehicle frame in block 1024, and then integrate the gyroscope data in block 1026. First sensor 108 may also wait to receive integrated gyroscope angle data from second sensor 106 in block 1028, from which it may calculate an articulation angle rate in block 1030. Once the process 1000 has calculated the distance measurement from the pulse received from second sensor 106, and received gyroscope data (or the integrated delta yaw angle measurement) from second sensor 106 in block 1032, it may start calculating the articulation angle in block 1034. This may include running a Kalman filter in block 1036, calculate the implement control point in block 1038, and finally, in block 1040 it may send the calculated information to towing vehicle 104's ECU, CA/AD system, or other automatic steering guidance system.

Figure 11:
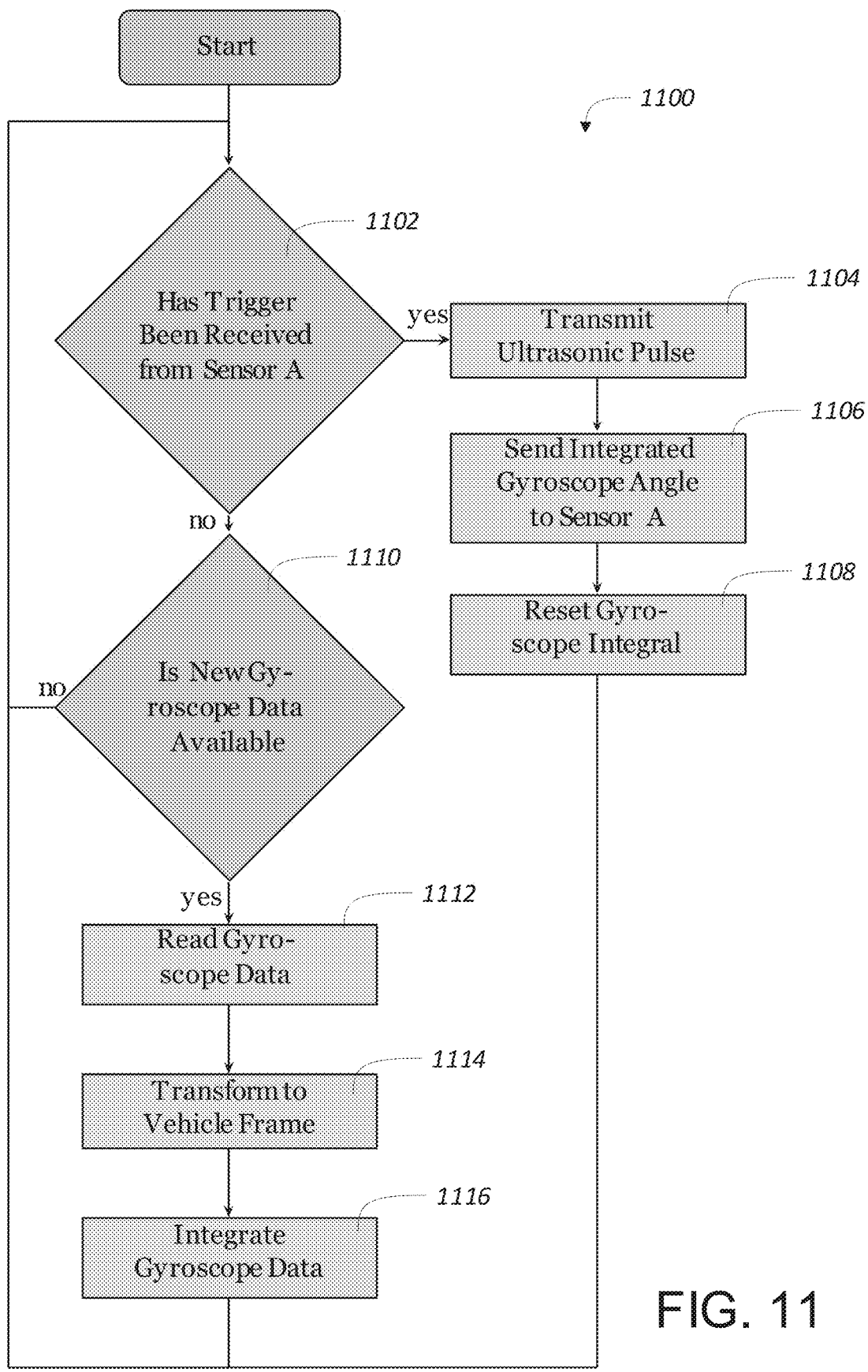
FIG. 11 is a flow chart of the process flow that may be executed by the sensor in FIG. 5, according to various embodiments.

FIG. 11 depicts a process 1100 flow of the code which could execute at least in part on the microprocessor in second sensor 106, according to some embodiments. Process 1100 works in conjunction with process 1000 on first sensor 108. The process waits for a trigger signal from first sensor 108 (this could be sent over a direct wire connection or by another means such as RF wireless transmission). When second sensor 106 receives the trigger signal from first sensor 108 in block 1102, second sensor 106 triggers the start of the ultrasonic pulse in block 1104, transmits the integrated delta yaw angle to first sensor 108 in block 1106, and then resets the integrated yaw angle back to zero in block 1108, ready for the process to repeat again. While second sensor 106 it is waiting for a trigger, it also continuously reads the gyroscope and, if new gyroscope data is available in block 1110, reads the new data in block 1112, transforms the data to the vehicle frame in block 1114, and integrates the yaw rate in block 1116 to form a delta yaw angle. In some embodiments, the yaw rate is integrated on second sensor 106, so that only low rate discrete angle measurements need be sent to first sensor 108, instead of the high rate continuous stream of the raw gyroscope rate measurements.

While the foregoing embodiments most of the processing handled integrally by first sensor 108, with some by second sensor 106, other embodiments may place some or all of the foregoing functionality in a separate device or processor. For example, some embodiments may have a single, discrete controller unit that receives raw data from ultrasonic (or other rangefinding) sensors, and from discrete gyro sensors, and/or from any additional sensors, where each of the various sensors otherwise has minimal or no processing capabilities. Other embodiments may place the functionality within the ECU or CA/AD system, again, receiving input from various discrete sensors. Still other embodiments may distribute functionality across a variety of devices, possibly selected based on proximity to the sensors and/or other considerations, such as available processing power.

Some of the operations described above may be implemented in software and other operations may be implemented in hardware. One or more of the operations, processes, or methods described herein may be performed by an apparatus, device, or system similar to those as described herein and with reference to the illustrated figures.

"Computer-readable storage medium" (or alternatively, "machine-readable storage medium"), such as may be used in first sensor 108 and/or second sensor 106, may include any type of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Examples of systems, apparatus, computer-readable storage media, and methods are provided solely to add context and aid in the understanding of the disclosed implementations. It will thus be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations. Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Having described and illustrated the principles of a preferred embodiment, it should be apparent that the embodiments may be modified in arrangement and detail without departing from such principles. Claim is made to all modifications and variation coming within the spirit and scope of the following claims.

What is claimed is:

1. A method for determining the position of a towed implement relative to a towing vehicle, comprising:
    measuring a distance between a first point on the towing vehicle and a second point on the towed implement using a first sensor set;
    identifying relative rotation rates for the towing vehicle and the towed implement using a second different sensor set;
    wherein the method further comprises combining the distance measured using the first sensor set and the relative rotation rates identified using the second different sensor set;
    determining an articulation angle between the towed implement and the towing vehicle from a result of the combining; and
    calculating the position of the towed implement relative to the towing vehicle from the articulation angle between the towed implement and the towing vehicle;
    determining absolute positions of the towing vehicle and the implement using a single Global Navigation Satellite System (GNSS) receiver associated with the towing vehicle, including:
        determining the absolute position of the towing vehicle using the GNSS receiver; and
        deriving an absolute position of the implement based on the calculated position and by referencing the absolute position of the towing vehicle;
    wherein the method further comprises inputting the absolute positions into a steering control unit associated with the towing vehicle, wherein the steering control unit guides the implement along a predetermined path based on the absolute positons.

2. The method of claim 1, further comprising measuring an articulation angle rate between the towed implement and the towing vehicle, and wherein the articulation angle is further determined using the articulation angle rate.

3. The method of claim 2, where the distance and the articulation angle rate are combined using a Kalman filter.

4. The method of claim 1, wherein the first sensor set comprises a first sensor and a second sensor, and the first sensor comprises an ultrasonic receiver and the second sensor comprises an ultrasonic transmitter.

5. The method of claim 4, wherein the second sensor set comprises a third sensor and a fourth sensor, and the third sensor comprises a first inertial sensor and the fourth sensor comprises a second inertial sensor.

6. The method of claim 4, wherein measuring the distance between the first point and second point using the first sensor set further comprises signaling one of the first sensor or second sensor to emit a pulse.

7. The method of claim 4, wherein the articulation angle is determined $$D^2=[A_x^t-P_x^t+(P_x^i-B_x^i)\cos(\Gamma)-(P_y^i-B_y^i)\sin(\Gamma)]^2+[A_y^t-P_y^t+(P_x^i-B_x^i)\sin(\Gamma)+(P_y^i-B_y^i)\cos(\Gamma)]^2 \quad (12)$$ using:

wherein:
    D is the measured distance;
    $A_x^t$ and $A_y^t$ are the x and y components of the first point relative to a control point on the towing vehicle;
    $B_x^i$ and $B_y^i$ are the x and y components of the second point relative to a control point on the towing vehicle;
    $P_x^t$ and $P_y^t$ are the x and y components of a position of a common hitch point relative to the towing vehicle control point;
    $P_x^i$ and $P_y^i$ are the x and y components of the position of the hitch point relative to the implement control point; and
    $\Gamma$ is the articulation angle, which is solved for.

8. The method of claim 1, wherein the position of the towed implement relative to the towing vehicle is calculated using:

$$\begin{bmatrix} I_x^t \\ I_y^t \end{bmatrix} = \begin{bmatrix} P_x^t - P_x^i\cos(\Gamma) + P_y^i\sin(\Gamma) \\ P_y^t - P_x^i\sin(\Gamma) - P_y^i\cos(\Gamma) \end{bmatrix} \quad (25)$$

wherein:
    $I_x^t$ and $I_y^t$ are the x and y components of a control point of the towed implement's position relative to the towing vehicle;
    $P_x^t$ and $P_y^t$ are the x and y components of a common hitch point between the towed implement and the towing vehicle, with respect to a control point of the towing vehicle;
    $P_x^i$ and $P_y^i$ are the x and y components of the hitch point with respect to the control point of the towed implement; and
    $\Gamma$ is the determined articulation angle.

9. A system for determining the position of a towed implement relative to a towing vehicle, comprising a hardware processor to:
    receive a distance between a first point on the towing vehicle and a second point on the towed implement using a first sensor set;
    identify relative rotation rates for the towing vehicle and the towed implement using a second different sensor set;
    determine a best estimate of an articulation angle between the towed implement and the towing vehicle from the distance and the rotation rates; and calculate the position of the towed implement relative to the towing vehicle from the best estimate of the articulation angle; and determine absolute positions of the towing vehicle and the implement using a single Global Navigation Satellite System (GNSS) receiver associated with the towing vehicle, including:
  determine the absolute position of the towing vehicle using the GNSS receiver; and
  derive an absolute position of the implement based on the calculated position and by referencing the absolute position of the towing vehicle;

the hardware processor further to input the absolute positions into a steering control unit associated with the towing vehicle, wherein the steering control unit guides the implement along a predetermined path based on the absolute positons.

10. The system of claim 9, where the hardware processor is further to measure an articulation angle rate between the towed implement and the towing vehicle, and further determine the best estimate of the articulation angle using the articulation angle rate.

11. The system of claim 9, wherein the first sensor set comprises a first sensor and a second sensor in communication with the hardware processor, wherein the first sensor comprises an ultrasonic receiver and the second sensor comprises an ultrasonic transmitter, and the first sensor and second sensor are to measure the distance.

12. The system of claim 11, wherein the second sensor set comprises a third sensor and a fourth sensor, wherein the third sensor comprises a first gyroscope and the fourth sensor comprises a second gyroscope.

13. The system of claim 11, wherein the first sensor and second sensor are to measure the distance between the first point and second point by the second sensor emitting an ultrasonic pulse that is received by the first sensor.

14. The system of claim 11, wherein the hardware processor is to calculate an articulation angle ($\Gamma$) using:

$$D^2 = [A_x^t - P_x^t + (P_x^i - B_x^i)\cos(\Gamma) - (P_y^i - B_y^i)\sin(\Gamma)]^2 + [A_y^t - P_y^t + (P_x^i - B_x^i)\sin(\Gamma) + (P_y^i - B_y^i)\cos(\Gamma)]^2 \quad (12)$$

wherein:
  D is the measured distance;
  $A_x^t$ and $A_y^t$ are the x and y components of the first point relative to a control point on the towing vehicle;
  $B_x^i$ and $B_y^i$ are the x and y components of the second point relative to a control point on the towing vehicle;
  $P_x^t$ and $P_y^t$ are the x and y components of a position of a common hitch point relative to the towing vehicle control point;
  $P_x^i$ and $P_y^i$ are the x and y components of the position of the hitch point relative to the implement control point; and
  wherein the best estimate of the articulation angle is based on the calculated articulation angle and an additional articulation angle estimated from the rotation rates.

15. The system of claim 11, wherein the hardware processor is to calculate the position of the towed implement relative to the towing vehicle using:

$$\begin{bmatrix} I_x^t \\ I_y^t \end{bmatrix} = \begin{bmatrix} P_x^t - P_x^i \cos(\Gamma) + P_y^i \sin(\Gamma) \\ P_y^t - P_x^i \sin(\Gamma) - P_y^i \cos(\Gamma) \end{bmatrix} \quad (25)$$

wherein:
  $I_x^t$ and $I_y^t$ are the x and y components of a control point of the towed implement's position relative to the towing vehicle;
  $P_x^t$ and $P_y^t$ are the x and y components of a common hitch point between the towed implement and the towing vehicle, with respect to a control point of the towing vehicle;
  $P_x^i$ and $P_y^i$ are the x and y components of the hitch point with respect to the control point of the towed implement; and
  $\Gamma$ is the best estimate of the articulation angle.

16. A memory storing instructions that, when executed by a processor, cause the processor to perform operations comprising:

measuring, using a first sensor set, a distance between a first point on the towing vehicle and a second point on the towed implement;

identifying relative rotation rates for the towing vehicle and the towed implement using a second different sensor set;

determining a best estimate of an articulation angle between the towed implement and the towing vehicle from the distance and the rotation rates;

calculating the relative position of the towed implement relative to the towing vehicle from the best estimate of the articulation angle; and determining absolute positions of the towing vehicle and the implement using a single Global Navigation Satellite System (GNSS) receiver associated with the towing vehicle, including:
  determining the absolute position of the towing vehicle using the GNSS receiver; and
  deriving an absolute position of the implement based on the calculated position and by referencing the absolute position of the towing vehicle;

wherein the operations further comprise inputting the absolute positions into a steering control unit associated with the towing vehicle, wherein the steering control unit guides the implement along a predetermined path based on the absolute positions.

17. The memory of claim 16, wherein the first sensor set comprises an ultrasonic receiver and an ultrasonic transmitter or the second sensor set comprises at least one gyroscope.

18. The memory of claim 17, wherein the operations further comprise calculating an articulation angle ($\Gamma$) using:

$$D^2 = [A_x^t - P_x^t + (P_x^i - B_x^i)\cos(\Gamma) - (P_y^i - B_y^i)\sin(\Gamma)]^2 + [A_y^t - P_y^t + (P_x^i - B_x^i)\sin(\Gamma) + (P_y^i - B_y^i)\cos(\Gamma)]^2 \quad (12)$$

wherein:
  D is the measured distance;
  $A_x^t$ and $A_y^t$ are the x and y components of the first point relative to a control point on the towing vehicle;
  $B_x^i$ and $B_y^i$ are the x and y components of the second point relative to a control point on the towing vehicle;
  $P_x^t$ and $P_y^t$ are the x and y components of a position of a common hitch point relative to the towing vehicle control point;
  $P_x^i$ and $P_y^i$ are the x and y components of the position of the hitch point relative to the implement control point; and
  wherein the best estimate of the articulation angle is based on the calculated articulation angle and an additional articulation angle estimated from the rotation rates.

19. The memory of claim 18, wherein the operations further comprise calculating the position of the towed implement relative to the towing vehicle using:

$$\begin{bmatrix} I_x^t \\ I_y^t \end{bmatrix} = \begin{bmatrix} P_x^t - P_x^i \cos(\Gamma) + P_y^i \sin(\Gamma) \\ P_y^t - P_x^i \sin(\Gamma) - P_y^i \cos(\Gamma) \end{bmatrix} \quad (25)$$

wherein:
- $I_x^t$ and $I_y^t$ are the x and y components of a control point of the towed implement's position relative to the towing vehicle;
- $P_x^t$ and $P_y^t$ are the x and y components of a common hitch point between the towed implement and the towing vehicle, with respect to a control point of the towing vehicle;
- $P_x^i$ and $P_y^i$ are the x and y components of the hitch point with respect to the control point of the towed implement; and
- $\Gamma$ is the best estimate of the articulation angle.

\* \* \* \* \*